United States Patent
El Ayoubi et al.

(10) Patent No.: US 10,631,241 B2
(45) Date of Patent: Apr. 21, 2020

(54) EVALUATING THE QUALITY OF COMMUNICATION IN A WIRELESS NETWORK

(71) Applicant: Orange, Paris (FR)

(72) Inventors: Salah Eddine El Ayoubi, Le Kremlin-bicêtre (FR); Sana Ben Jemaa, Issy les Moulineaux (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/537,348

(22) PCT Filed: Dec. 17, 2015

(86) PCT No.: PCT/FR2015/053580
§ 371 (c)(1),
(2) Date: Jun. 16, 2017

(87) PCT Pub. No.: WO2016/097625
PCT Pub. Date: Jun. 23, 2016

(65) Prior Publication Data
US 2018/0020401 A1    Jan. 18, 2018

(30) Foreign Application Priority Data

Dec. 18, 2014  (FR) ..................... 14 62766

(51) Int. Cl.
*H04W 48/00*   (2009.01)
*H04W 48/20*   (2009.01)
(Continued)

(52) U.S. Cl.
CPC ........... *H04W 48/20* (2013.01); *H04W 24/08* (2013.01); *H04W 48/14* (2013.01); *H04W 48/18* (2013.01)

(58) Field of Classification Search
CPC .............................. H04W 48/20; H04W 24/08
See application file for complete search history.

(56) References Cited

U.S. PATENT DOCUMENTS

2004/0142693 A1    7/2004  Feder et al.
2013/0301617 A1*  11/2013  Kuhn ................ H04W 36/0083
                                              370/331
(Continued)

FOREIGN PATENT DOCUMENTS

EP        1542405        6/2005
EP        2670186        9/2015
(Continued)

OTHER PUBLICATIONS

International Search Report and Written Opinion dated Apr. 7, 2016 for Application No. PCT/FR2015/053580.

*Primary Examiner* — Pakee Fang
(74) *Attorney, Agent, or Firm* — Knobbe, Martens, Olson & Bear, LLP

(57) ABSTRACT

A system for evaluating the quality of communication in a wireless network, comprising at least one management center and at least one mobile terminal, is disclosed. The management center can be responsible for managing a given server station and a set of server stations which are adjacent to that server station. The management center can be configured to obtain the loads of said adjacent server stations, and to calculate, on the basis of said loads, the signal-to-noise ratio which would be characteristic of a communication between that server station and a mobile terminal positioned at a given point of the geographic area served by this server station.

7 Claims, 1 Drawing Sheet

(51) Int. Cl.
*H04W 48/14* (2009.01)
*H04W 24/08* (2009.01)
*H04W 48/18* (2009.01)

(56) References Cited

U.S. PATENT DOCUMENTS

2015/0305004 A1* 10/2015 Ohta .................. H04W 16/04
370/330
2016/0105728 A1* 4/2016 Schmidmer ...... H04N 21/44008
725/110

FOREIGN PATENT DOCUMENTS

| FR | 2977117 | 12/2012 |
| FR | 2992819 | 1/2014 |
| KR | 2010/0092656 | 8/2010 |
| WO | WO 2006/066007 | 6/2006 |
| WO | WO 2014/013196 | 1/2014 |
| WO | WO 2014/112941 | 7/2014 |

* cited by examiner

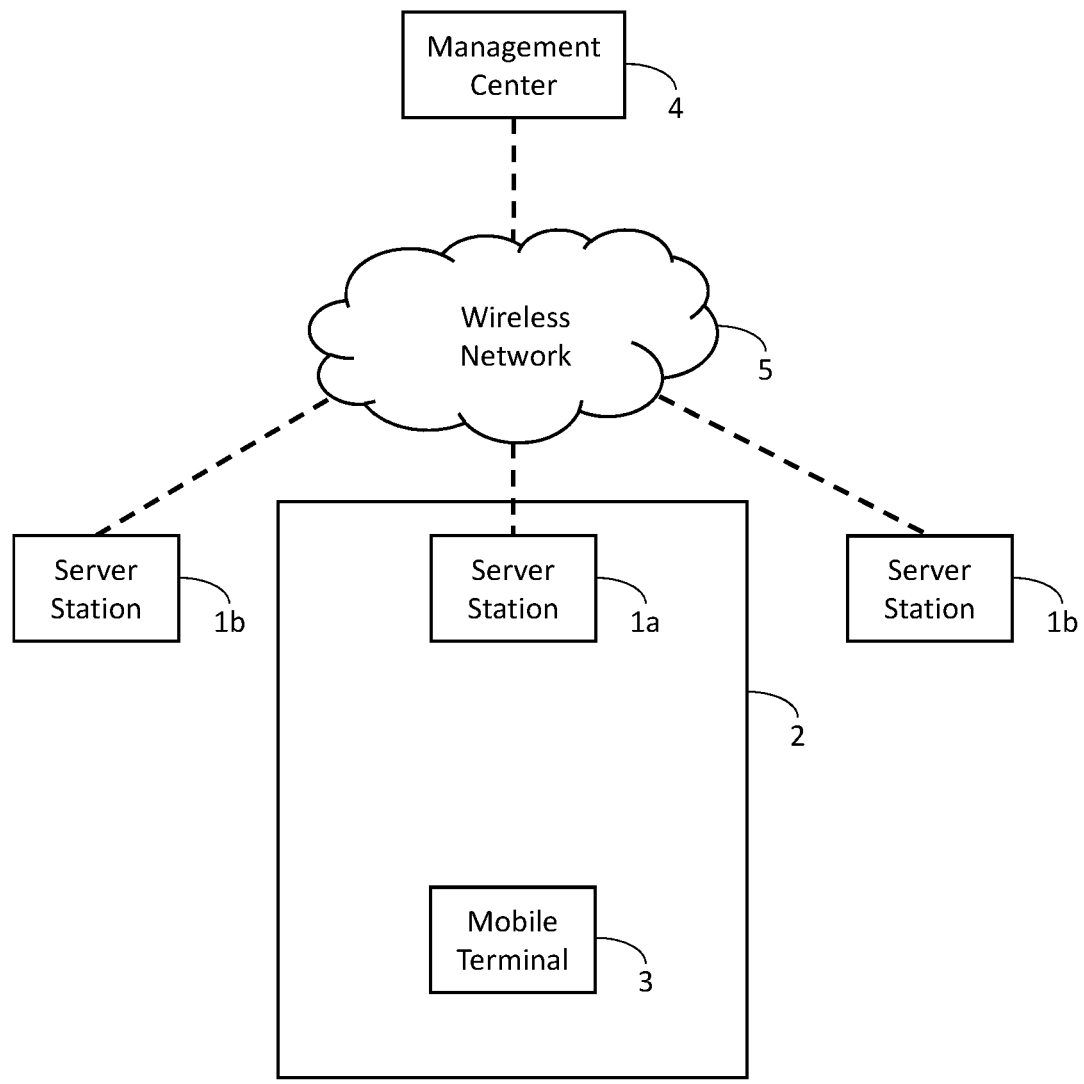

EVALUATING THE QUALITY OF COMMUNICATION IN A WIRELESS NETWORK

RELATED APPLICATIONS

This application is the U.S. National Phase of Application No. PCT/FR2015/053580 entitled "EVALUATING THE QUALITY OF COMMUNICATION IN A WIRELESS NETWORK" filed Dec. 17, 2015, which designated the United States, and which claims the benefit of French Application No. 1462766 filed Dec. 18, 2014.

BACKGROUND

The invention relates to the field of telecommunications. More particularly, the invention relates to the quality of communication made available to mobile terminals attached to stations, referred to as "server" stations, that transmit and/or receive in the radiofrequency range (e.g. cellular networks).

Mobile terminals, such as smartphones and personal computers (PC) are nowadays capable of activating and using several logical interfaces associated with one or more physical interfaces. Such terminals are said to be "multi-interface" (MIF) terminals.

A plurality of IP addresses can then be allocated to such MIF terminals in order to connect to different types of network such as a wireless local area network (WLAN), or a cellular network.

In this respect, it should be observed that the invention is compatible with all types of WLAN networks, e.g. WiFi networks in compliance with the 802.11 standard of the Institute of Electrical and Electronics Engineers (IEEE). The invention is also compatible with all types of cellular networks, e.g. those that make use of GMS/GPRS technology as defined in version 97, and subsequent versions of the GSM standard, or that make use of universal mobile telecommunications system (UMTS) technology as defined in particular in the 23.002, 23.003, and 29.060 standards of the third-generation partnership project (3GPP), or that make use of long-term evolution (LTE) technology, or indeed of "femto 3G" technology as defined in 3GPP document TR 25.820 V8.2.0 (2008 September).

For a mobile terminal having access to at least one radiocommunications network having a certain number of server stations, the procedure for allocating resources usually takes place as follows:

a) the terminal scans the various pilot signals that it can receive, and for each respective pilot signal it measures the respective loss over the propagation path ("path loss");

b) when the terminal seeks to initiate communication, it sends a request for attachment to the server station providing the most powerful received pilot signal, indicating in this request said path loss together with the data rate desired for the communication;

c) this request for attachment reaches a management center (internal or external) in charge of managing the server station;

d) as a function of said path loss and of the load on the server station, the management center decides whether or not to authorize the request attachment; and e) if accepted, the management center decides as a function of the load on the server station whether to grant the resources requested in order to obtain the data rate desired by the terminal, in full or in part only.

Once attached to the network, i.e. once connected to a server station, the terminal is conventionally suitable for measuring a signal over interference plus noise ratio (SNR) relating to the signal received from the server station, and to transmit this SNR value to the server station. The server station may then, by way of example on the basis of the SNR value, determine the best modulation and coding scheme for the communication. As explained in detail below, the greater the SNR, the better the quality of the communication.

An MIF terminal that has the means and the rights for accessing a plurality of networks ought thus to seek attachment to the network that will give it the best SNR, once it has become attached. The problem that arises under such conditions is knowing how the terminal can discover the respective SNR values of the respective networks to which it has access before any attachment, or the SNR that it would have on a second network while it is already attached to a first network.

In a first known solution, the operator of the network uses simulators that rely on theoretical models for describing the reality of the terrain, e.g. electromagnetic wave propagation models or models of the data exchange traffic in the network.

The main limitation of such simulations is associated with the accuracy of the models.

In a second known solution, radio conditions in a network may advantageously be measured within the network by terminals belonging to users of the network. Provision is thus made for the mobile terminals belonging to a terrestrial mobile radio network such as a GSM network, or a UMTS network, or an enhanced data rates for GSM evolution (EDGE) network, or indeed a network of the WIMAX type, to take measurements in the network under consideration either periodically or following predefined events. Thus, the proposal entitled "MDT measurement model" (meeting No. 68bis of the RAN W2G standardization group of the $3^{rd}$ generation partnership project (3GPP), Valencia, Spain, Jan. 18 to 22, 2010) discloses a radio measurement system in which a management entity of a UMTS terrestrial radio access network (UTRAN) broadcasts a message requesting the mobile terminals of users to take a measurement of a specified nature in a specific geographical zone (that system is known as the minimization of drive tests (MDT) method). The terminals of the network receiving the request decide whether or not to take the requested measurement, in particular as a function of whether or not they are situated in the measurement zone, which they can determine by means of a positioning system such as a global positioning system (GPS) device with which they are equipped; each terminal that has taken the measurement can store the results of the measurement and transmit them to said UTRAN network at a predetermined instant. The network can then discover the SNR that might characterize a communication with a first terminal, on the basis of the SNR characterizing, at the same instant, a communication with a second terminal that is geographically very close to the first terminal.

The drawback of that second solution is that these need not be any such second terminal.

In a third known solution, the operator of a network uses a database in which to accumulate the results of SNR measurements at various locations and at various times (day of the year, time of day). If the database has sufficient data, the operator can find therein the SNR as measured at the same location as the terminal in question, on the previous day at the same time, or on the same day and at the same time last year, and so on.

The drawback of that third solution is that it assumes that reception conditions are reproduced periodically at a location of the network. Unfortunately, such an assumption is not realistic, in particular because of weekly and seasonal fluctuations, and also because of rapid variations in the architecture of the network in order to satisfy the rapidly increasing demand for data rate from users.

SUMMARY

In a first aspect, the present invention therefore provides various devices.

Thus, firstly, the invention provides a management center of a wireless network for managing a given server station and a set of server stations neighboring said given server station. Said management center is remarkable in that it comprises means for:

obtaining the loads of said neighboring server stations; and on the basis of said loads, calculating the signal to noise ratio SNR that would characterize a communication between a given server station and a mobile terminal situated at a given point of the geographical area served by the server station.

FIG. 1 is a schematic illustration. In particular, FIG. 1 illustrates a given server station 1a within a geographic area 2 served by the server station 1a. FIG. 1 also illustrates a mobile terminal 3 located at a given point of the geographic area 2 served by the server station 1a. The given server station 1a is managed by a management center 4 of a wireless network 5. The management center 4 also manages a set of server stations 1b neighboring the given server station 1a.

It should be observed that in the context of the present invention, the term "load" is used of a server station to designate the fraction of its radio resources that are allocated to the terminals that are attached to that station, averaged over a period of time that is long enough to smooth short duration fluctuations due to the variations in the needs of users for resources during a session, and also due to starting and ending sessions of short duration. Said resources are naturally a function of the underlying radio technology; by way of example, they may be a number of channels, or of frequency subbands, or of time slots, or of codes, etc.

By means of these provisions, said server station can advantageously know the value of the SNR that would characterize a communication with said mobile terminal, and may possibly know this even before initiating such a communication.

By way of example, said server stations may be base stations of a cellular network, or access points of a WLAN network. Furthermore, by way of example, said management center may be the operations and management center as defined by the 3GPP; it should be observed that in present networks, operations and management centers usually obtain the loads of server stations averaged over a duration of a minimum of five minutes.

Secondly, the invention also provides a mobile terminal, including means for taking account of the value of the SNR that would characterize a communication with a server station of a network to which said mobile terminal has access, said value being sent to the mobile terminal by a management center of said network, either directly or via said server station.

By means of these provisions, said mobile terminal can advantageously know the value of the SNR that would characterize a communication with said server station even before initiating such a communication, and can know the value of the SNR that would characterize a communication via a server station of a second network while it is actually connected with a server station of a first network.

According to particular characteristics, said mobile terminal further includes means for:

receiving a plurality of respective SNR values relating to a plurality of respective networks to which said terminal has access;

comparing said SNR values; and requesting attachment to that one of said networks that is associated with the greatest SNR.

The invention also provides, thirdly, a service entity including means for:

receiving from at least one management center as set out briefly above the values of the SNR that would characterize a communication between a given mobile terminal and a set of server stations;

on the basis at least of said SNR information, selecting the network to which the terminal ought to request its attachment from among the networks to which the mobile terminal has access; and informing the mobile terminal of the network as selected in this way.

The invention also provides, fourthly, a control entity of a wireless network, the control entity including means for:

receiving from at least one management center as set out briefly above, the SNR values that would characterize a communication between a mobile terminal and a set of server stations if said mobile terminal were located at various locations of the network; and taking account at least of said SNR values in order to estimate the state of the network in terms of quality of communication.

The invention also provides, fifthly, an over-the-top (OTT) tool manufacturer including means for:

receiving from at least one management center as set out briefly above, the SNR values that would characterize a communication between a mobile terminal and a set of server stations if said mobile terminal were located at various locations of the network; and taking account at least of said SNR values in order to construct a map of the coverage of the network.

It should be observed that it is possible to make the devices in the context of software instructions and/or in the context of electronic circuits.

In a second aspect, the invention provides a system for evaluating the quality of communication in a wireless network. Said system is remarkable in that it comprises at least one management center as set out briefly above, together with at least one mobile terminal as set out briefly above.

The advantages made available by the system are essentially the same as those made available by the devices set out briefly above.

The invention also provides a computer program that is downloadable from a communications network and/or stored on a computer readable medium and/or executable by a microprocessor. The program is remarkable in that it includes instructions for controlling the operation of a management center, or of a terminal, or of a service entity, or of a control entity, or of an OTT tool manufacturer, as set out briefly above, when the program is executed on a computer.

The advantages made available by such computer programs are essentially the same as those made available by said devices.

Other aspects and advantages of the invention appear on reading the following detailed description of particular embodiments given as non-limiting examples.

DETAILED DESCRIPTION

The description begins with some reminders about quality of communication, and in particular reception by a terminal in a wireless network.

In a wireless network, consideration may be given to a set of A server stations each transmitting with an example power $P_k^{(b)}$, where k=1, ..., A and b=1, ..., B in B frequency subbands. In order to simplify the description, it is assumed that these A stations are capable of delivering the same maximum power $P_{max}^{(b)}$ in a given subband b.

Let the propagation loss of the signal between a server station k and a point $\vec{r}$ of the network be written $h_{k \to \vec{r}}$. The geographical area served by the server station k is written $D_k$. In other words:

$$D_k = \{\vec{r} \mid h_{k \to \vec{r}} > h_{k' \to \vec{r}} \forall k' \in 1, \ldots, A \text{ and } k' \neq k\}. \tag{1}$$

By definition, a server station k considers that another server station k' is its "neighbor" if there is at least one point $\vec{r}$ of $D_k$ such that the propagation loss $h_{k' \to \vec{r}}$ is greater than a predetermined threshold.

The SNR $R_{\vec{r}}^{(b)}$ in the frequency subband of number band at a point $\vec{r}$ served by a server station k is given by:

$$R^{(b)}(\vec{r}) = \frac{h_{k \to \vec{r}} P_{max}^{(b)}}{\theta^2 + \sum_{k' \neq k} h_{k' \to \vec{r}} P_{k'}^{(b)}}, \tag{2}$$

where $\theta^2$ is thermal noise. It should be observed that the interference is due only to the server stations of the same network, since it is assumed that other networks operate in other frequency bands.

The maximum data rate $\gamma_{\vec{r}}^{(b)}$ (e.g. measured in bits per second) that the server station k is capable of delivering to the point $\vec{r}$ in the frequency subband of number b (i.e. the data rate that can be reached if the server station sends data to this point $\vec{r}$ only) is conventionally given by:

$$\gamma_{\vec{r}}^{(b)} = \varphi(R^{(b)}(\vec{r})), \tag{3}$$

where $\varphi$ is a function known to the person skilled in the art. This function $\varphi$ models the impact of fluctuations in path loss over data rate (a phenomenon known as "fading") for the radio systems in question, in particular for the specific radio technology (OFDMA, CMDA, etc.) in question.

The number of frequency subbands required to satisfy the data rate $\gamma_{\vec{r}}$ requested by a terminal situated at the point $\vec{r}$ for the purpose of a certain communication with a certain quality of service (QoS) can be deduced therefrom (or more generally it is possible to deduce therefrom the resources that are compatible with the communication technology in question).

An embodiment of the invention is described below in which the "load" $c_{k'}^{(b)}$ of a server station k' is defined as a function of the power $P_{k'}^{(b)}$ transmitted in a subband b. Thus:

$$c_{k'}^{(b)} = \frac{P_{k'}^{(b)}}{P_{max}^{(b)}}. \tag{4}$$

Under such conditions, equation (2) can be rewritten in the following form:

$$R^{(b)}(\vec{r}) = \frac{1}{\tau_{\vec{r}}^{(b)} + \sum_{k' \neq k} c_{k'}^{(b)} I_{k' \to \vec{r}}}, \tag{5}$$

$$I_{k' \to \vec{r}} = \frac{h_{k' \to \vec{r}}}{h_{k \to \vec{r}}} \tag{6}$$

where:

is the "interference factor" caused at point $\vec{r}$ of $D_k$ by a server station k', and:

$$\tau_{\vec{r}}^{(b)} = \frac{\theta^2}{h_{k \to \vec{r}} P_{max}^{(b)}} \tag{7}$$

is "relative noise".

In practice, it can be considered that the only significant interference comes from a certain number M of server stations "neighboring" (as defined above) the server station k. With this approximation, equation (5) becomes:

$$R^{(b)}(\vec{r}) = \frac{1}{\tau_{\vec{r}}^{(b)} + \sum_{k' \neq k}^{M} c_{k'}^{(b)} I_{k' \to \vec{r}}}, \tag{8}$$

where the sum relates only to the M server stations that are neighbors of the server station k.

During a step prior to performing the invention, a management center of the network calculates the M interference factors, e.g. on the basis of path losses measured by a terminal situated at the point $\vec{r}$. Furthermore, the management center of the network may then calculate the relative noise $\tau_{\vec{r}}^{(b)}$ from the SNR measured by a terminal situated at the point $\vec{r}$ in communication with the server station k, and the load values measured by the M server stations neighboring the server station k; nevertheless, it should be observed that the contribution of this relative noise to the denominator of equation (8) is generally negligible.

Equation (8) can then be used at any time by the management center to calculate the SNR at point $\vec{r}$ as a function of the value taken at that instant by the M loads $c_{k'}^{(b)}$.

In particular, when the network is suitable for balancing loads between neighboring server stations, said loads, at a given instant, are all equal to a certain common value $c^{(b)}$. If it is assumed that the relative noise $\tau_{\vec{r}}^{(b)}$ is negligible, then equation (8) becomes:

$$R^{(b)}(\vec{r}) = \frac{1}{c^{(b)} I_{\vec{r}}^{tot}}, \tag{9}$$

where by definition:

$$I_{\vec{r}}^{tot} = \sum_{k'=1}^{M} I_{k' \to \vec{r}} \tag{10}$$

is the total interference factor at the point $\vec{r}$. Consequently, under such circumstances, the management center can conveniently calculate the SNR $R^{(b)}(\vec{r}, t_2)$ at an instant $t_2$ on the basis of the common load $c^{(b)}(t_2)$ at that instant $t_2$, and the SNR $R^{(b)}(\vec{r}, t_1)$ and the common load $c^{(b)}(t_1)$ at an earlier instant $t_1$:

$$R^{(b)}(\vec{r}, t_2) = \frac{R^{(b)}(\vec{r}, t_1)c^{(b)}(t_1)}{c^{(b)}(t_2)}. \quad (11)$$

The management centers can make use of equation (8) and in particular of the equation (11) derived therefrom when conditions lend themselves thereto, in various ways.

In a first example, a management center of a first network to which an MIF terminal has access transmits to that terminal (directly or via a station serving said MIF terminal in this first network) the SNR value relating to the point $\vec{r}$ where the terminal is situated, for the purpose of a possible communication with the first network. Likewise, a management center of a second network to which the MIF terminal has access transmits to this terminal (directly or via the station serving said MIF terminal in the second network) the value of the SNR relating to the point $\vec{r}$ where the terminal is situated, for the purpose of a possible communication with the second network. Where appropriate, this mechanism is performed for still more networks to which the terminal has access. Thus, when the user of the terminal seeks to set up communication with a third party, the user can advantageously request attachment to the network that provides the best SNR. Nevertheless, this mode of operation is possible only if the MIF terminal is suitable for receiving the SNR values and for comparing them.

That is why, in a second example, the respective management centers send the respective SNR values to a service entity such as the access network discovery and selection function (ANDSF) as described in 3GPP standard TS 24.312. Said service entity then makes use of at least one such SNR data value to select the network to which the terminal ought to request attachment from amongst the networks to which the terminal has access, and informs the terminal which network it has selected in this way.

In a third example, the SNR information from various points of a network are delivered to a control entity of the network by one or more management centers in order to enable the control entity to know the state of the network in terms of quality of communication. By means of these provisions, a network operator can rapidly identify any need for additional resources at locations in the network where quality is becoming degraded, and can, if possible, improve the allocation of resources in the network, e.g. by activating server stations that were on standby.

In a fourth example, the SNR information from various points of the network is delivered by one or more management centers to a manufacturer of "over-the-top" (OTT) tools, such as a supplier of maps showing the coverage of the network to subscribers to the network. The problem with the conventional technique used for constructing SNR maps is that SNR values depend to a large extent on the load conditions of the network, and therefore change greatly over time; this degrades the consistency of the data in an SNR map, since the data is the result of values collected at different locations and at different times.

One possible application of the present invention to mapping a network consists in constructing a dynamic map of SNR values from a previously constructed reference map. More precisely:

the prior map of the SNR at a plurality of points of the network is constructed in such a manner that for each of said points, the SNR at that point is measured together with the loads $c_k^{(b)}$ of the server stations of the network neighboring the server station serving said point of the network; and then the SNR map at said points of the network at a given instant is constructed in such a manner that at each of said points the SNR at said point is calculated as a function of the load $c_k^{(b)}$ of said neighboring server stations as measured at said given instant, and with reference to the prior map.

It may be observed that it is convenient to construct the prior map when the neighboring server stations are "empty", i.e. with low loads. In other words, in practice, SNR values are initially selected at a time when the network is being used very little; thereafter, a dynamic SNR map is constructed by making use of information about the loads on the server stations of the network, information that a network management center can obtain quickly at any time.

The implementation of the invention within nodes of a wireless network, and in particular the management centers and the terminals, or the service entities, or the control entities, or the manufacturers of OTT tools, can be performed by means of software and/or hardware components.

The software components may be incorporated in a conventional computer program for managing a network node. That is why, as mentioned above, the present invention also provides a computer system. The computer system comprises in conventional manner a central processor unit using signals to control a memory and also an input unit and an output unit.

Furthermore, the computer system may be used to execute a computer program of the invention. Specifically, the invention also provides a computer program downloadable from a communications network and including instructions for controlling the operation of a management center or of a terminal or of a service entity or of a control entity or of an OTT tool manufacturer of the invention, when the program is executed on a computer. The computer program may be stored on a computer readable medium, and may be executable by a microprocessor.

The program may use any programming language and be in the form of source code, object code, or code intermediate between source code and object code, in a partially compiled form, or in any other desirable form.

The invention also provides a non-removable, or partially removable, or totally removable data medium that is readable by a computer and that includes instructions of a computer program as mentioned above. The data medium may be any entity or device capable of storing the program. For example, the medium may comprise storage means such as a read only memory (ROM), e.g. a compact disk (CD) ROM, or a microelectronic circuit ROM, or magnetic recording means, such as a hard disk, or indeed a universal serial bus (USB) flash drive.

Furthermore, the data medium may be a transmissible medium such as an electrical or optical signal, suitable for being conveyed via an electrical or optical cable, by radio, or by other means. The computer program of the invention may in particular be downloaded from an Internet type network.

In a variant, the data medium may be an integrated circuit in which the computer program is incorporated.

The invention claimed is:

1. A management center of a wireless network configured to manage a given server station and a set of server stations neighboring the given server station, the management center configured to:

calculate interference factors caused by the neighboring server stations at a given point of a geographical area served by the given server station on the basis of path losses at the given point of the geographical area served by the given server station;

obtain the loads of the neighboring server stations; and on the basis of the obtained loads and the calculated interference factors, calculate a signal to noise ratio (SNR) that would characterize a communication between the given server station and a mobile communication terminal situated at the given point of the geographical area served by the given server station.

2. The management center of claim 1, wherein the management center is further configured to send calculated value of the SNR to the mobile terminal.

3. The management center of claim 1, wherein the management center is further configured to send the calculated value of the SNR to a service entity that is suitable, on the basis of at least the calculated value of the SNR, for providing to the mobile terminal information regarding a recommended network for attachment from among the networks to which the mobile terminal has access.

4. The management center of claim 1, wherein the management center is further configured to send the calculated value of the SNR to a network control entity configured to collect quality of communication data in the network.

5. The management center of claim 1, wherein the management center is further configured to send the calculated SNR value to a manufacturer of over-the-top (OTT) tools suitable for collecting quality of communication data in the network.

6. A non-transitory computer readable medium comprising instructions which, when executed by a processor, cause the processor to perform a method of controlling a management center of a wireless network configured to manage a given server station and a set of server stations neighboring the given server station, the method comprising:

calculating interference factors caused by the neighboring server stations at a given point of a geographical area served by the given server station on the basis of path losses at the given point of the geographical area served by the given server station;

obtaining the loads of the neighboring server stations; and on the basis of the obtained loads and the calculated interference factors, calculating a signal to noise ratio (SNR) that would characterize a communication between the given server station and a mobile communication terminal situated at the given point of the geographical area served by the given server station.

7. A computer having stored thereon instructions, which, when executed by the computer, cause the computer to perform a method of controlling the operation of a management center of a wireless network configured to manage a given server station and a set of server stations neighboring the given server station, the method comprising:

calculating interference factors caused by the neighboring server stations at a given point of a geographical area served by the given server station on the basis of path losses at the given point of the geographical area served by the given server station;

obtaining the loads of the neighboring server stations; and on the basis of the obtained loads and the calculated interference factors, calculating a signal to noise ratio (SNR) that would characterize a communication between the given server station and a mobile communication terminal situated at the given point of the geographical area served by the given server station.

* * * * *